(12) United States Patent
Mathew et al.

(10) Patent No.: US 11,784,842 B2
(45) Date of Patent: Oct. 10, 2023

(54) TRAFFIC REPLICATION IN OVERLAY NETWORKS SPANNING MULTIPLE SITES

(71) Applicant: VMware, Inc., Palo Alto, CA (US)

(72) Inventors: Subin Cyriac Mathew, San Jose, CA (US); Alexander Tessmer, Mountain View, CA (US); Chidambareswaran Raman, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/942,948

(22) Filed: Sep. 12, 2022

(65) Prior Publication Data

US 2023/0006853 A1 Jan. 5, 2023

Related U.S. Application Data

(63) Continuation of application No. 16/983,344, filed on Aug. 3, 2020, now Pat. No. 11,456,888, which is a
(Continued)

(51) Int. Cl.
*H04L 12/18* (2006.01)
*H04L 12/46* (2006.01)
(Continued)

(52) U.S. Cl.
CPC ........ *H04L 12/1886* (2013.01); *H04L 12/185* (2013.01); *H04L 12/4633* (2013.01); *H04L 41/0893* (2013.01); *H04L 67/563* (2022.05)

(58) Field of Classification Search
CPC ............... H04L 12/1886; H04L 67/563; H04L 12/4633; H04L 41/0893; H94L 12/185
See application file for complete search history.

(56) References Cited

U.S. PATENT DOCUMENTS

| 5,224,100 A | 6/1993 | Lee et al. |
| 5,331,634 A | 7/1994 | Fischer |

(Continued)

FOREIGN PATENT DOCUMENTS

| CN | 101119578 A | 2/2008 |
| CN | 101783734 A | 7/2010 |

(Continued)

OTHER PUBLICATIONS

Casado, Martin, et al. "Ethane: Taking Control of the Enterprise," SIGCOMM'07, Aug. 27-31, 2007, 12 pages, ACM, Kyoto, Japan.
(Continued)

*Primary Examiner* — Duc C Ho
(74) *Attorney, Agent, or Firm* — ADELI LLP

(57) ABSTRACT

Some embodiments provide a method of replicating messages for a logical network. At a particular tunnel endpoint in a particular datacenter, the method receives a message to be replicated to members of a replication group. The method replicates the message to a set of tunnel endpoints of the replication group located in a same segment of the particular datacenter as the particular tunnel endpoint. The method replicates the message to a first set of proxy endpoints of the replication group, each of which is located in a different segment of the particular datacenter and for replicating the message to tunnel endpoints located in its respective segment of the particular datacenter. The method replicates the message to a second set of proxy endpoints of the replication group, each of which is located in a different datacenter and for replicating the message to tunnel endpoints located in its respective datacenter.

20 Claims, 8 Drawing Sheets

Related U.S. Application Data continuation of application No. 16/445,030, filed on Jun. 18, 2019, now Pat. No. 10,778,457.

(51) Int. Cl.
*H04L 41/0893* (2022.01)
*H04L 67/563* (2022.01)

(56) References Cited

U.S. PATENT DOCUMENTS

| | | |
|---|---|---|
| 5,729,685 A | 3/1998 | Chatwani et al. |
| 5,831,975 A | 11/1998 | Chen et al. |
| 5,926,463 A | 7/1999 | Ahearn et al. |
| 6,018,526 A | 1/2000 | Liu et al. |
| 6,104,699 A | 8/2000 | Holender et al. |
| 6,181,697 B1 | 1/2001 | Nurenberg et al. |
| 6,192,417 B1 | 2/2001 | Block et al. |
| 6,728,777 B1 | 4/2004 | Lee et al. |
| 6,804,263 B1 | 10/2004 | Okawa |
| 6,836,481 B1 | 12/2004 | Hotta |
| 6,862,263 B1 | 3/2005 | Simmons |
| 6,901,510 B1 | 5/2005 | Srivastava |
| 6,917,985 B2 | 7/2005 | Madruga et al. |
| 6,934,252 B2 | 8/2005 | Mehrotra et al. |
| 6,950,428 B1 | 9/2005 | Horst et al. |
| 7,046,630 B2 | 5/2006 | Abe et al. |
| 7,209,439 B2 | 4/2007 | Rawlins et al. |
| 7,286,490 B2 | 10/2007 | Saleh et al. |
| 7,333,487 B2 | 2/2008 | Novaes |
| 7,529,199 B1 | 5/2009 | Wijnands et al. |
| 7,606,187 B2 | 10/2009 | Zeng et al. |
| 7,792,099 B2 | 9/2010 | Yasukawa et al. |
| 7,792,987 B1 | 9/2010 | Zohra et al. |
| 7,813,340 B2 | 10/2010 | Novaes |
| 7,876,754 B2 | 1/2011 | Novaes |
| 7,937,438 B1 | 5/2011 | Miller et al. |
| 7,940,685 B1 | 5/2011 | Breslau et al. |
| 7,961,646 B2 | 6/2011 | Liu et al. |
| 8,089,964 B2 | 1/2012 | Lo et al. |
| 8,223,649 B2 | 7/2012 | Rangarajan et al. |
| 8,224,971 B1 | 7/2012 | Miller et al. |
| 8,310,957 B1 | 11/2012 | Rekhter |
| 8,312,129 B1 | 11/2012 | Miller et al. |
| 8,391,185 B2 | 3/2013 | Wijnands et al. |
| 8,553,689 B2 | 10/2013 | Bachmann et al. |
| 8,612,627 B1 | 12/2013 | Brandwine |
| 8,625,603 B1 | 1/2014 | Ramakrishnan et al. |
| 9,432,204 B2 | 8/2016 | Shen et al. |
| 9,602,385 B2 | 3/2017 | Tessmer et al. |
| 9,602,392 B2 | 3/2017 | Tessmer et al. |
| 9,794,079 B2 | 10/2017 | Tessmer et al. |
| 9,887,851 B2 | 2/2018 | Shen et al. |
| 10,103,980 B1 | 10/2018 | Tiwari |
| 10,218,526 B2 | 2/2019 | Shen et al. |
| 10,333,727 B2 | 6/2019 | Tessmer et al. |
| 10,623,194 B2 | 4/2020 | Shen et al. |
| 10,778,457 B1 | 9/2020 | Mathew et al. |
| 10,789,267 B1 | 9/2020 | Dhoolam et al. |
| 10,999,087 B2 | 5/2021 | Tessmer |
| 11,310,150 B2 | 4/2022 | Tessmer et al. |
| 11,456,888 B2 | 9/2022 | Mathew et al. |
| 11,469,983 B1 | 10/2022 | Malov et al. |
| 2002/0091926 A1 | 7/2002 | Fukutomi |
| 2002/0138618 A1 | 9/2002 | Szabo |
| 2004/0267897 A1 | 12/2004 | Hill et al. |
| 2005/0111474 A1 | 5/2005 | Kobayashi |
| 2005/0147095 A1 | 7/2005 | Guerrero et al. |
| 2006/0045092 A1 | 3/2006 | Kubsch et al. |
| 2006/0182033 A1 | 8/2006 | Chen et al. |
| 2006/0187950 A1 | 8/2006 | Bou-Diab et al. |
| 2006/0239290 A1 | 10/2006 | Lin et al. |
| 2007/0058638 A1 | 3/2007 | Guichard et al. |
| 2007/0253409 A1 | 11/2007 | Fu et al. |
| 2008/0002727 A1 | 1/2008 | Yamane |
| 2008/0020758 A1 | 1/2008 | Nagarajan et al. |
| 2008/0059556 A1 | 3/2008 | Greenspan et al. |
| 2008/0071900 A1 | 3/2008 | Hecker et al. |
| 2008/0104273 A1 | 5/2008 | Bruck et al. |
| 2008/0175239 A1 | 7/2008 | Sistanizadeh et al. |
| 2008/0186962 A1 | 8/2008 | Sinha |
| 2008/0205302 A1 | 8/2008 | Florit et al. |
| 2008/0212496 A1 | 9/2008 | Zou |
| 2009/0285206 A1 | 11/2009 | Kawauchi et al. |
| 2010/0002698 A1 | 1/2010 | Clack et al. |
| 2010/0106779 A1 | 4/2010 | Yamauchi |
| 2010/0157888 A1 | 6/2010 | Aggarwal et al. |
| 2010/0157889 A1 | 6/2010 | Aggarwal et al. |
| 2010/0271948 A1 | 10/2010 | Challapali et al. |
| 2010/0284402 A1 | 11/2010 | Narayanan |
| 2011/0022652 A1 | 1/2011 | Lai et al. |
| 2011/0075664 A1 | 3/2011 | Lambeth et al. |
| 2011/0188500 A1 | 8/2011 | Du |
| 2011/0202920 A1 | 8/2011 | Takase |
| 2011/0280572 A1 | 11/2011 | Vobbilisetty et al. |
| 2011/0317696 A1 | 12/2011 | Aldrin et al. |
| 2011/0317703 A1 | 12/2011 | Dunbar et al. |
| 2012/0106950 A1 | 5/2012 | Madrahalli et al. |
| 2012/0155322 A1 | 6/2012 | Lamba et al. |
| 2012/0177042 A1 | 7/2012 | Berman |
| 2012/0185553 A1 | 7/2012 | Nelson |
| 2012/0233326 A1 | 9/2012 | Shaffer et al. |
| 2012/0236734 A1 | 9/2012 | Sampath et al. |
| 2012/0254943 A1 | 10/2012 | Li |
| 2012/0278804 A1 | 11/2012 | Narayanasamy et al. |
| 2012/0307826 A1 | 12/2012 | Matsuoka |
| 2013/0040677 A1 | 2/2013 | Lee et al. |
| 2013/0114597 A1 | 5/2013 | Ogisawa et al. |
| 2013/0124750 A1 | 5/2013 | Anumala et al. |
| 2013/0159826 A1 | 6/2013 | Mason et al. |
| 2013/0223454 A1 | 8/2013 | Dunbar et al. |
| 2013/0266015 A1 | 10/2013 | Qu et al. |
| 2013/0318219 A1 | 11/2013 | Kancherla |
| 2013/0322443 A1 | 12/2013 | Dunbar et al. |
| 2014/0052877 A1 | 2/2014 | Mao |
| 2014/0092907 A1 | 4/2014 | Sridhar et al. |
| 2014/0098814 A1 | 4/2014 | Bansal et al. |
| 2014/0169366 A1 | 6/2014 | Kotalwar et al. |
| 2014/0192804 A1 | 7/2014 | Ghanwani et al. |
| 2014/0195666 A1 | 7/2014 | Dumitriu et al. |
| 2014/0243035 A1 | 8/2014 | Jung et al. |
| 2014/0372624 A1 | 12/2014 | Wang et al. |
| 2015/0016300 A1 | 1/2015 | Devireddy et al. |
| 2015/0055651 A1 | 2/2015 | Shen et al. |
| 2015/0131655 A1 | 5/2015 | Dayama et al. |
| 2015/0163100 A1 | 6/2015 | Graf et al. |
| 2015/0172132 A1 | 6/2015 | Tessmer et al. |
| 2015/0172165 A1 | 6/2015 | Tessmer et al. |
| 2015/0254190 A1 | 9/2015 | Yang et al. |
| 2015/0263862 A1 | 9/2015 | Sugyou et al. |
| 2015/0280928 A1 | 10/2015 | Tessmer et al. |
| 2015/0381484 A1 | 12/2015 | Hira et al. |
| 2016/0119156 A1 | 4/2016 | Drake et al. |
| 2016/0285932 A1 | 9/2016 | Thyamagundalu et al. |
| 2016/0301724 A1* | 10/2016 | Kodaypak ........... H04L 65/1069 |
| 2016/0352531 A1 | 12/2016 | Shen et al. |
| 2017/0171061 A1 | 6/2017 | Tessmer et al. |
| 2018/0048478 A1 | 2/2018 | Tessmer et al. |
| 2018/0062914 A1 | 3/2018 | Boutros et al. |
| 2018/0159696 A1 | 6/2018 | Shen et al. |
| 2018/0212788 A1 | 7/2018 | Iszlai et al. |
| 2019/0190734 A1 | 6/2019 | Shen et al. |
| 2019/0207779 A1 | 7/2019 | Immidi et al. |
| 2019/0273625 A1 | 9/2019 | Tessmer et al. |
| 2020/0403819 A1 | 12/2020 | Mathew et al. |
| 2021/0044445 A1 | 2/2021 | Bottorff et al. |
| 2021/0092092 A1 | 3/2021 | Lo et al. |
| 2021/0258178 A1 | 8/2021 | Tessmer et al. |
| 2023/0006922 A1 | 1/2023 | Karunakaran et al. |

FOREIGN PATENT DOCUMENTS

| | | |
|---|---|---|
| CN | 101282338 B | 8/2011 |
| EP | 1855420 A1 | 11/2007 |
| GB | 2458154 A | 9/2009 |

(56) References Cited

FOREIGN PATENT DOCUMENTS

| | | |
|---|---|---|
| JP | 2001230774 A | 8/2001 |
| JP | 2005184234 A | 7/2005 |
| JP | 2006121517 A | 5/2006 |
| JP | 2006229967 A | 8/2006 |
| JP | 2009272803 A | 11/2009 |
| JP | 2010103757 A | 5/2010 |
| JP | 2011171874 A | 9/2011 |
| JP | 2015531212 A | 10/2015 |
| WO | 2004082221 A2 | 9/2004 |
| WO | 2006095391 A1 | 9/2006 |
| WO | 2013009850 A1 | 1/2013 |
| WO | 2013078979 A1 | 6/2013 |
| WO | 2014087591 A1 | 6/2014 |
| WO | 2015152976 A1 | 10/2015 |

OTHER PUBLICATIONS

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.
Dumitriu, Dan Mihai, et al., U.S. Appl. No. 61/514,990, filed Aug. 4, 2011, 31 pages.
Gross, J., et al., "Geneve: Generic Network Virtualization Encapsulation," Feb. 14, 2014, 24 pages, Internet Engineering Task Force (IETF).
Narten, Thomas, et al., "Address Resolution Problems in Large Data Center Networks," Jan. 2013, 17 pages, Internet Engineering Task Force (IETF).

\* cited by examiner

```
<MulticastGroup_01:

<Datacenter_102: <L3Segment_104:
    VTEP112, VTEP114,
    VTEP115><L3Segment_105: VTEP121,
    VTEP122, VTEP123, VTEP124, VTEP125,
    VTEP126><L3Segment_108: VTEP151,
    VTEP152, VTEP153, VTEP154, VTEP155,
    VTEP156>>

<Datacenter_103: <L3Segment_106:
    VTEP131, VTEP132, VTEP135,
    VTEP136><L3Segment_107: VTEP141,
    VTEP144, VTEP145, VTEP146>>>
                                            405
MulticastGroup_02:

...
```

```
<MulticastGroup_01:

<Datacenter_102: <L3Segment_105:
    VTEP121>>

<Datacenter_102: <L3Segment_108:
    VTEP151>>

<Datacenter_103: <L3Segment_107:
    VTEP141>>>
                                            410
<MulticastGroup_02:

TRAFFIC REPLICATION IN OVERLAY NETWORKS SPANNING MULTIPLE SITES

CLAIM OF BENEFIT TO PRIOR APPLICATIONS

This application is a continuation application of U.S. patent application Ser. No. 16/983,344, filed Aug. 3, 2020, now issued as U.S. Pat. No. 11,456,888. U.S. patent application Ser. No. 16/983,344 is a continuation application of U.S. patent application Ser. No. 16/445,030, filed Jun. 18, 2019, now issued as U.S. Pat. No. 10,778,457. U.S. patent application Ser. No. 16/983,344, now published as U.S. Patent Publication 2020/0403819, and U.S. patent application Ser. No. 16/445,030, now issued as U.S. Pat. No. 10,778,457, are hereby incorporated by reference.

BACKGROUND

Multicast is the delivery of a message or information to a group of destination machines simultaneously in a single transmission from the source. Copies of the message are automatically replicated and forwarded by other network elements. Forwarding and replicating multicast packets are usually done by intermediate nodes in the network—switches fulfill multicast forwarding inside a layer 2 network while (multicast) routers fulfill multicast routing across layer 3 networks. Typically, switches that support multicast use IGMP (Internet Group Management Protocol) snooping, while routers that support multicast use PIM (Protocol Independent Multicast) as the routing protocol.

Numerous multicast applications have been developed and deployed, including financial software, video services, etc. A use case worth noting is overlay based network virtualization (layer 2 tunneling), referred to as VXLAN. VXLAN can support a large number of logical layer 2 networks over a physical IP network. It is based on MAC-over-UDP encapsulation, and requires an IP multicast group to be allocated for encapsulation of BUM (broadcast, unknown unicast, and multicast) traffic inside a logical network. As a result, a large number of multicast groups may be consumed, especially in a cloud environment in which each tenant may create a number of logical networks. These created logical networks and corresponding multicast groups may span across physical layer 3 networks, datacenters, and regions.

Unfortunately, use of IP multicast is limited by a lack of infrastructure to support it. Low end switches and routers usually do not support IGMP and PIM, and they usually do not support a large number of multicast groups. Moreover, even when the physical network hardware has the capabilities to support multicast, users generally eschew enabling multicast in datacenter networks due to the complexity in management and scalability of IP multicast. Enabling multicast across datacenters and provider networks is even more difficult.

What is needed is a network system for enabling a large number of multicast groups across physical networks that may include datacenters or provider networks. Such a network system should support network virtualization without relying on built-in multicast capabilities of the physical network, while nevertheless leverage the multicast capabilities offered by the physical network to achieve higher efficiency, even when multicast is not fully enabled in the physical network. Further, such a network system should minimize the amount of bandwidth used when transmitting multicast traffic between physical networks.

BRIEF SUMMARY

Some embodiments of the invention provide a hierarchical method for scalable replication of messages (e.g., broadcast, unknown unicast, and multicast messages) for a logical overlay network (e.g., a VXLAN) spanning multiple physical underlay networks (e.g., datacenters). The logical network includes network endpoints (e.g., virtual machines, containers, etc.) that are the sources and destinations of network traffic. Each network endpoint is associated with a tunnel endpoint through which it sends traffic to and receives traffic from other network endpoints. When a tunnel endpoint located in a particular network segment of a particular physical network receives a message to be replicated to other logical network endpoints, in some embodiments the tunnel endpoint (i) replicates the message to other tunnel endpoints within the same network segment, (ii) replicates the message to a proxy tunnel endpoint for each of the other segments within the same physical network, and (iii) replicates the message to a proxy tunnel endpoint for each of the other physical networks. The tunnel endpoints receiving the message are responsible for forwarding the message to the logical network endpoints that require receipt of the message.

Each of the tunnel endpoints may belong to one or more replication groups (e.g., multicast groups), and each group may be associated with a different logical network or logical network segment. Because the logical network spans multiple physical networks with multiple physical network segments (e.g., IP subnets, VLANs, multicast islands), a given replication group may have tunnel endpoint members located in different physical network segments and different physical networks. Thus, the proxy endpoints for each network segment replicate the message to other tunnel endpoints belonging to the replication group within their respective segments. Similarly, the proxy endpoints for each other physical network replicate the message to (i) the other tunnel endpoints belonging to the replication group within network segments of their respective physical networks and (ii) proxy endpoints for each network segment within their respective physical networks.

As mentioned, in some embodiments the message is a broadcast, unknown-unicast or multicast (BUM) packet. In some embodiments, each network segment is able to support multicast traffic between the tunnel endpoints. In some embodiments, some or all of the network segments do not support multicast protocols, and instead use unicast protocols to replicate and forward multicast packets to each endpoint in the multicast group. Multicast replication of BUM traffic to different network segments using proxy endpoints is described in more detail in U.S. Pat. No. 9,432,204, which is incorporated herein by reference.

In some embodiments, a tunnel endpoint or proxy endpoint receives the message from another tunnel endpoint (e.g., a proxy endpoint), and determines whether and where to replicate the message based on flags that are set in the message (e.g., in fields of an encapsulation header). For example, in some embodiments, if the message has no replication flags set, then the receiving tunnel endpoint does not perform any replication and only forwards the message to any logical network endpoints (e.g., VMs) that require the message. If the message header (e.g., the encapsulation header) has a segment replication flag set, then the receiving tunnel endpoint is a proxy endpoint for its segment and replicates the message to other tunnel endpoints in its network segment that belong to the replication group (sending these messages without any flags set). If the message header has a network replication flag set, then the receiving tunnel endpoint is a proxy endpoint for its physical network and replicates the message to (i) proxy endpoints for the other segments of its physical network (sending these messages with the segment replication flag set) and (ii) other tunnel endpoints in its network segment of its physical network (sending these messages without any flags set).

When replicating the message, in some embodiments the receiving endpoint identifies (e.g., from the message header) which logical network and which replication group the message belongs to. For each selected endpoint to which the receiving endpoint must replicate the message, the receiving endpoint encapsulates the message with a header that includes its own address as the source address, the selected proxy endpoint as the destination address, a virtual network identifier (VNI) for the logical network associated with the message, a replication (e.g., multicast) group identifier, and the replication flags set as needed to ensure that the receiving endpoints do not perform redundant or unnecessary replication of the message after receiving it.

In some embodiments, each tunnel endpoint belonging to a replication group individually selects the proxy endpoints that it uses for replicating messages to other network segments and other physical networks. To make these selections, in some embodiments each tunnel endpoint receives configuration information from a centralized network control system that identifies the other tunnel endpoints in each replication group to which the tunnel endpoint belongs, sorted into the network segments and physical networks in which each of the other tunnel endpoints is located. In other embodiments, this information may be exchanged directly between tunnel endpoints (e.g., using a distributed control plane protocol).

Based on this configuration information (listing the tunnel endpoints belonging to the replication group, sorted by physical network and network segment), each tunnel endpoint in the group selects proxy endpoints for (i) each other physical network and (ii) each other network segment within its respective physical network. In some embodiments, in order to balance the traffic load and replication burden across the various endpoints, each tunnel endpoint randomly selects the proxy endpoint for each other physical network and each other network segment within its respective physical network using a probabilistic or other random selection algorithm. In other embodiments, the tunnel endpoints also receive traffic load or other statistics and use these to inform the proxy endpoint selection. If a tunnel endpoint receives an update to the list for a network segment or physical network, in some embodiments the tunnel endpoint re-selects the proxy endpoint for that updated network segment or physical network.

As noted above, in some embodiments a tunnel endpoint may belong to more than one replication group (e.g., be associated with different logical networks or different logical network segments). If a tunnel endpoint belongs to multiple replication groups, then it may select different proxy endpoints for the different replication groups in the same segment or physical network. In addition, that tunnel endpoint may be selected as a proxy endpoint by other tunnel endpoints in multiple replication groups.

In some embodiments, the physical networks include provider networks or datacenters, which may be located in different physical locations. These physical networks may in some embodiments also be grouped by geographic region or area. Network interconnections between different physical network groups may have higher cost, higher latency, and/or lower bandwidth than interconnections between physical networks in the same geographic region. Therefore, some embodiments also provide for additional levels of replication, i.e., for segments of a physical network, physical networks, and groups of physical networks (and groups of groups of physical networks, etc.). In such embodiments, each tunnel endpoint would also select proxy endpoints for each other group of physical networks, and the encapsulation header would include a third flag that could be set.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 4 illustrates an example of configuration information used by a tunnel endpoint to identify proxy endpoints.

DETAILED DESCRIPTION

Some embodiments of the invention provide a hierarchical method for scalable replication of messages (e.g., broadcast, unknown unicast, and multicast messages) for a logical overlay network (e.g., a VXLAN) spanning multiple physical underlay networks (e.g., datacenters). The logical network includes network endpoints (e.g., virtual machines, containers, etc.) that are the sources and destinations of network traffic. Each network endpoint is associated with a tunnel endpoint through which it sends traffic to and receives traffic from other network endpoints. When a tunnel endpoint located in a particular network segment of a particular physical network receives a message to be replicated to other logical network endpoints, in some embodiments the tunnel endpoint (i) replicates the message to other tunnel endpoints within the same network segment, (ii) replicates the message to a proxy endpoint for each of the other segments within the same physical network, and (iii) replicates the message to a proxy endpoint for each of the other physical networks. The tunnel endpoints receiving the message are responsible for forwarding the message to the logical network endpoints that require receipt of the message.

Each of the tunnel endpoints may belong to one or more replication groups (e.g., multicast groups), and each group may be associated with a different logical network or logical network segment. Because the logical network spans multiple physical networks with multiple physical network segments (e.g., IP subnets, VLANs, multicast islands), a given replication group may have tunnel endpoint members located in different physical network segments and different physical networks. Thus, the proxy endpoints for each network segment replicate the message to other tunnel endpoints belonging to the replication group within their respective segments. Similarly, the proxy endpoints for each other physical network replicate the message to (i) the other tunnel endpoints belonging to the replication group within network segments of their respective physical networks and (ii) proxy endpoints for each network segment within their respective physical networks.

As mentioned, in some embodiments the message is a broadcast, unknown-unicast or multicast (BUM) packet. In some embodiments, each network segment is able to support multicast traffic between the tunnel endpoints. In some embodiments, some or all of the network segments do not support multicast protocols, and instead use unicast protocols to replicate and forward multicast packets to each endpoint in the multicast group. Multicast replication of BUM traffic to different network segments using proxy endpoints is described in more detail in U.S. Pat. No. 9,432,204, which is incorporated herein by reference.

Figure 1A:
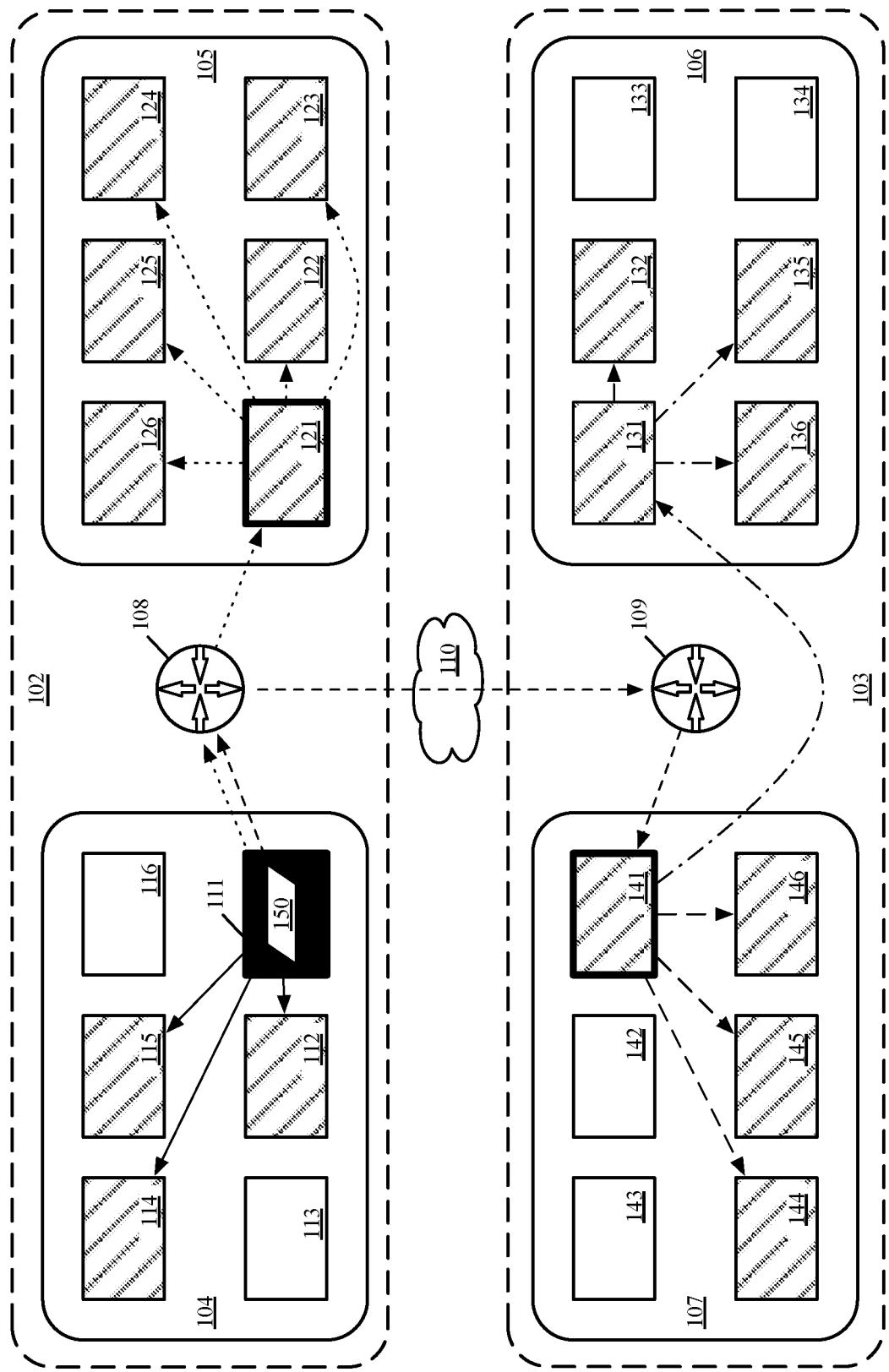
FIGS. 1A-1B illustrates a network in which a tunnel endpoint replicates a data packet to all tunnel endpoints of a particular replication group across different segments and datacenters of the network.

For some embodiments, FIG. 1 illustrates a network 100 that spans multiple datacenters 102 and 103. At least one logical network is implemented in the network 100 across the multiple datacenters, and in FIG. 1A a tunnel endpoint associated with one of the endpoints of the logical network replicates a data packet to all tunnel endpoints of a particular replication group across different segments and datacenters of the network 100. The logical network is implemented by physical forwarding elements in the network 100 (e.g., software forwarding elements executing on host computers, hardware forwarding elements to which logical network endpoints connect, etc.) that also act as the tunnel endpoints for an overlay network. Each logical network, in some embodiments, is an abstraction of a network that allows for numerous independent and isolated networks to be implemented within the physical network 100. For clarity, host computers and logical network endpoints are not shown in this figure.

Each of the different logical networks implemented within the network 100 may span a single segment within a datacenter, multiple segments within multiple datacenters, both of the illustrated datacenters as well as additional datacenters not shown in the figure, etc. A logical network of some embodiments may be defined to include multiple logical forwarding elements (e.g., logical switches and logical routers), which are implemented by the physical forwarding elements of the network and also may span multiple segments and datacenters.

As illustrated in the example of FIG. 1A, the logical network is divided across two datacenters 102 and 103 located at different sites (e.g., different geographical locations). Each of these datacenters is divided into multiple physical segments; the first datacenter 102 is divided into segments 104 and 105, while the second datacenter 103 is divided into segments 106 and 107. There may be additional physical segments of each datacenter that are not shown. In some embodiments, each of the segments is a subnet, VLAN, or multicast island within the physical network of the datacenter. The segments in each datacenter exchange network traffic via the datacenter fabric (e.g. routers 108 and 109), and the datacenters exchange traffic over a datacenter interconnect 110 (e.g. a wide area network (WAN) or the Internet).

As illustrated, each of the network segments 104-107 includes a number of tunnel endpoints that receive and forward network data traffic. Specifically, segment 104 in datacenter 102 includes endpoints 111-116, segment 105 in datacenter 102 includes endpoints 121-126, segment 106 in datacenter 103 includes endpoints 131-136, and segment 107 in datacenter 103 includes endpoints 141-146.

As mentioned, the physical forwarding elements of the network 100 also act as tunnel endpoints for forwarding logical network data packets through the network (as the network 100 includes additional forwarding elements, not shown in FIG. 1, that are not configured to implement the logical network). When one of the tunnel endpoint forwarding elements receives a data packet from a logical network endpoint (the sources and destinations of the data packets), it performs logical network processing to identify the destination(s) in the network 100 for the data packets, encapsulates the data packet, and transmits the data packet to the destination through the physical network of the datacenter(s).

Figure 1B:
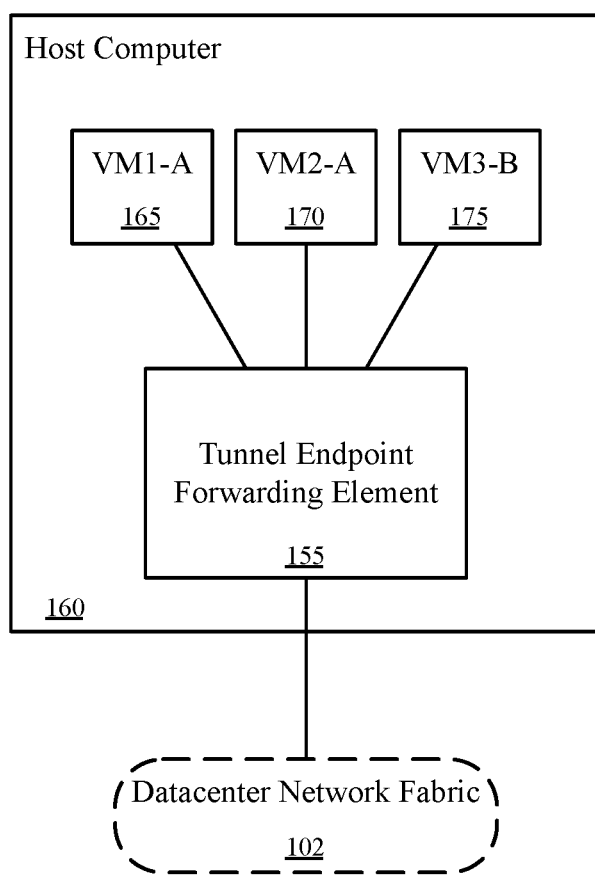

An example of a tunnel endpoint forwarding element 155 is illustrated in FIG. 1B. In some embodiments, the forwarding element 155 executes in virtualization software (not shown) on a host computer 160 connected to the network fabric of datacenter 102, and is managed by a datacenter network controller cluster (not shown). Even though only a single forwarding element 155 is shown, in some embodiments a set of forwarding elements may execute on the host computer to collectively implement one or more logical networks. In this example, the forwarding element 155 implements logical forwarding elements (e.g., logical routers and logical switches) for logical networks A and B. Other forwarding elements (not shown) executing on the host computer, on other host computers in the same datacenter, and in other datacenters, also implement the same logical networks A and B and their logical forwarding elements.

The forwarding element 155 is connected to virtual machines VM1 165 and VM2 170 belonging to logical network A, executing on the host computer 160 (i.e., on top of the virtualization software). In addition, a third virtual machine 175, belonging to logical network B and also connected to the forwarding element 155, executes on the host computer. The virtual machines are examples of network endpoints that exchange data traffic (e.g., packets) with other network endpoints in their respective logical network, and with external tunnel endpoints. Outgoing packet data from the VMs 165 and 170 is encapsulated by the tunnel endpoint forwarding element for delivery over the physical network 100, with the encapsulation header including a logical network identifier (also referred to as a virtual network identifier) for logical network A. Incoming packet data is decapsulated by the tunnel endpoint forwarding element, which then performs logical network processing based on information in the encapsulation header (including the virtual network identifier) and the underlying packet in order to deliver the traffic to the correct network endpoint.

FIG. 1A also illustrates the replication of a data packet 150 that is sent by a logical network endpoint (not shown) connected to tunnel endpoint 111, which is illustrated as solid black. The data packet 150 is to be replicated to all member endpoints of a replication group (e.g., because the data packet 150 is broadcast to all network endpoints connected to a particular logical switch or to any logical switch of a particular logical network). The members of this particular replication group includes endpoints 111, 112, 114, 115, 121-126, 131, 132, 135, 136, 141, and 144-146, illustrated using diagonal lines in FIG. 1. Tunnel endpoints that are not illustrated as shaded do not belong to the replication group. Not all tunnel endpoints of a physical network segment belong to the same replication group, and tunnel endpoints may be members of more than one replication group. For example, though all tunnel endpoints located in network segment 105 belong to the replication group, only some of the tunnel endpoints in the other segments belong to the same group. In some embodiments, these other endpoints may belong to other replication groups, and some of the endpoints in the replication group may also belong to these other replication groups.

The source tunnel endpoint 111 (i.e., the tunnel endpoint that receives the data packet from its source logical network endpoint) forwards the data packet 150 to any other logical network endpoints connected to that tunnel endpoint 111 (not shown). For instance, if the source logical network endpoint was VM 165 in FIG. 1B, then the tunnel endpoint 155 might forward the data packet to VM 170. In addition, the source tunnel endpoint 111 is in the network segment 104, and replicates (solid lines) the data packet 150 to other members of the replication group within the network segment 101, namely to tunnel endpoints 112, 114, and 115. These tunnel endpoints 112, 114, and 115 each forward the data packet 150 to their connected logical network endpoints (not shown). It should be noted that, in replicating a data packet to another tunnel endpoint, the source tunnel endpoint 111 encapsulates a copy of the data packet in a tunnel header (e.g., a VXLAN tunnel header) with a network address of the source tunnel endpoint 111 as the source address and a network address of the respective destination tunnel endpoint as the destination address. Thus, when the source tunnel endpoint sends the data packet 150 to tunnel endpoints 112, 114, and 115, the same inner data packet 150 is sent with three different tunnel headers.

The source tunnel endpoint 111 also replicates the same data packet 150 to member tunnel endpoints in network segments 105-107. However, the source tunnel endpoint 111 does not forward the data packet 150 directly to all the member tunnel endpoints in these other network segments. Instead, the source tunnel endpoint 111 forwards (dotted line) the replication data packet 150 to a proxy endpoint in the other network segment 105 in its own datacenter 102 (e.g., via router 108). Specifically, the source tunnel endpoint 111 has selected the endpoint 121 as the proxy endpoint for the network segment 105. Proxy endpoint 121 is outlined with a thicker black border to indicate that it was selected as a proxy by source tunnel endpoint 111. The proxy endpoint 121 then forwards (dotted lines) the data packet 150 to the other tunnel endpoints 122-126 in its own segment 105 that are members of the replication group. The tunnel endpoints 122-126 each forward the data packet 150 to their connected logical network endpoints (not shown). Again, as noted above, each time the data packet 150 is replicated, the sending tunnel endpoint encapsulates the data packet 150 in a tunnel header.

In order to forward the data packet 150 to tunnel endpoints in the other datacenter 103, the source tunnel endpoint 111 selects a single proxy endpoint in the datacenter 103 (in this case, the proxy endpoint 141 in segment 107). Proxy endpoint 141 is also outlined with a thicker black border to indicate that it was selected as a proxy by source tunnel endpoint 111. The source tunnel endpoint forwards (dashed line) the data packet to the datacenter proxy endpoint 141 via the datacenter interconnect 110 and router 109. The proxy endpoint 141 forwards the data packet 150 to its connected logical network endpoints (not shown), and forwards (dashed lines) the data packet 150 to the local tunnel endpoints 144-146 that are members of the replication group in the same segment 107. The tunnel endpoints 144-146 each forward the data packet 150 to their connected logical network endpoints (not shown).

In addition, the proxy endpoint 141 selects a proxy endpoint 131 in the other segment 106 of its datacenter 103 and forwards (dot-dash line) the packet to this proxy endpoint 131. The proxy endpoint 131 then forwards (dot-dash lines) the data packet 150 to the other tunnel endpoints 132, 135, and 136 in its segment 106 that are members of the replication group. The endpoints 131, 132, 135, and 136 each forward the data packet 150 to their connected logical network endpoints (not shown).

In this example, source tunnel endpoint 111 only selected two proxy endpoints, namely tunnel endpoint 121 and 141, both of which are outlined with a thicker border. The tunnel endpoint 131 also served as a proxy endpoint, but was selected by proxy endpoint 141 rather than source tunnel endpoint 111 (this proxy endpoint 131 is not outlined with the thicker border, to distinguish it from the proxies selected by the source tunnel endpoint 111). From the perspective of source tunnel endpoint 111, only one proxy endpoint per segment in its own datacenter is required to be selected, and only one proxy endpoint per other datacenter. These selected proxies perform their own assessment of the network topology and select proxies of their own, in hierarchical fashion. Source tunnel endpoint 111 does not know or need to know that tunnel endpoint 131 is also a proxy, as that responsibility has been delegated to the next level of the hierarchy to proxy endpoint 141. This distributed responsibility allows the technique to scale, to cases with many more tunnel endpoints, segments, and datacenters than the simplified example illustrated in FIG. 1.

By using proxies in different network segments in the same datacenter 102, the source tunnel endpoint 111 is able to forward the data packet 150 with minimal computing and bandwidth cost, since there could potentially be many other segments and each segment could potentially have many members of the replication group. In the example of FIG. 1, source tunnel endpoint 111 only needs to send a single packet to a single endpoint 121 instead of sending six different copies of the same packet over the router 108. Using proxies also allows the replication and forwarding of messages to fully utilize the local network structure of each network segment, some of which has hardware configured to support multicast in some embodiments. Doing so leverages the multicast capabilities offered by the physical network to achieve higher efficiency while supporting optimized replication and delivery paths based on the physical network topology. For segments that do not support multicast, a selected proxy endpoint must rely on unicast to replicate the packet 150 to the other group members in the segment.

In addition, by using proxies for different datacenters, the source tunnel endpoint 111 is able to forward the data packet 150 without having to send duplicate packets over the datacenter interconnect 110, one for each subnet. The simplified example of FIG. 1 only has two datacenters with two segments each, but there could potentially be several such datacenters, each with many subnets. Using only a single proxy for the entire datacenter avoids high bandwidth usage which can be especially costly in hybrid cloud deployments, where the customer is charged for traffic into and out of the local datacenter environment.

In some embodiments, a tunnel endpoint receives the message from either a network endpoint or another tunnel endpoint (e.g., a proxy endpoint), and determines whether and where to replicate the message based on flags that are set in the message (e.g., in fields of an encapsulation header). For example, in some embodiments, if the message has no replication flags set, then the receiving endpoint does not perform any replication and only forwards the message to any logical network endpoints (e.g., VMs) that require the message. If the message header (e.g., the encapsulation header) has a segment replication flag set, then the receiving tunnel endpoint is a proxy endpoint for its segment and replicates the message to other tunnel endpoints in its network segment that belong to the replication group (sending these messages without any flags set). If the message header has a network (e.g., datacenter) replication flag set, then the receiving tunnel endpoint is a proxy endpoint for its physical network and replicates the message to (i) proxy endpoints for the other segments of its physical network (sending these messages with the segment replication flag set) and (ii) other tunnel endpoints in its network segment of its physical network (sending these messages without any flags set).

When replicating the message, in some embodiments the receiving endpoint identifies (e.g., from the message header) to which logical network and/or replication group the message belongs. For each selected endpoint to which the receiving tunnel endpoint replicates the message, the receiving tunnel endpoint encapsulates the message with a header that includes its own address as the source address, the selected tunnel endpoint as the destination address, a virtual network identifier (VNI) for the logical network associated with the message, a replication (e.g., multicast) group identifier, and the replication flags set as needed to ensure that the receiving tunnel endpoints do not perform redundant or unnecessary replication of the message after receiving it.

Figure 2:
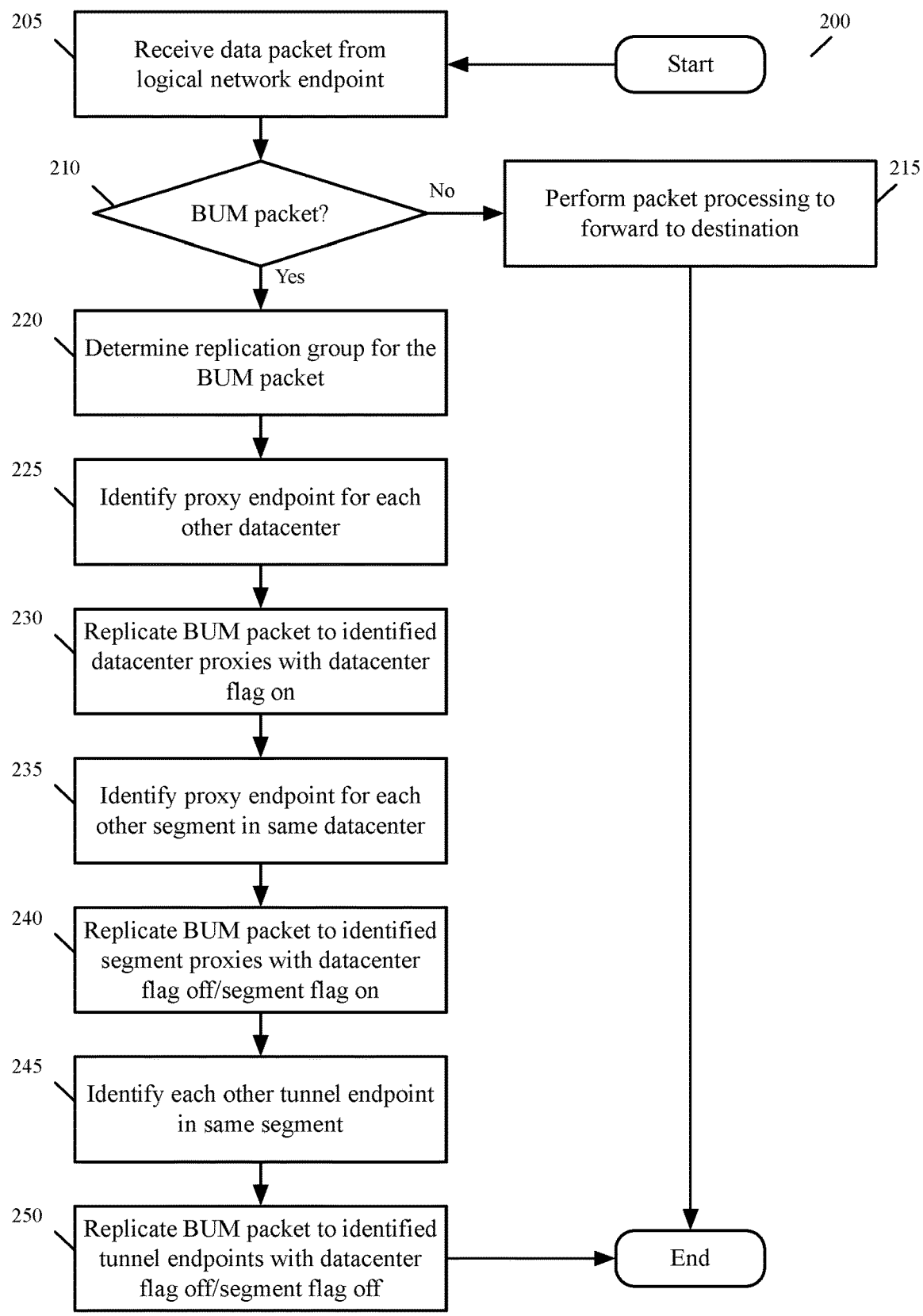
FIG. 2 conceptually illustrates a process performed by a tunnel endpoint in some embodiments when it receives a message for replication from a logical endpoint.

FIG. 2 conceptually illustrates a process 200 of some embodiments for receiving a message from a logical network endpoint and forwarding the message to one or more destinations. In some embodiments, the process 200 is performed by a tunnel endpoint upon receiving a message from a logical endpoint that connects to the tunnel endpoint. For example, the process 200 could be performed by source tunnel endpoint 111 in FIG. 1, described above.

The process 200 begins by receiving (at 205) a data packet from a logical network endpoint. In some embodiments, the tunnel endpoint receives the packet from a logical network endpoint that executes on the same host computer as the source tunnel endpoint.

The process 200 determines (at 210) whether the received packet is a broadcast, unicast, or multicast (BUM) packet. In some embodiments, this determination is made by checking whether the destination IP address of the received packet is a multicast IP address, or whether the destination MAC address is a broadcast address. If the process 200 determines that the packet is not a BUM packet, then the process performs packet processing at 215 to forward the packet to its destination (i.e., as a unicast packet). The process 200 then ends.

If, however, the received packet is a BUM packet, the process 200 determines (at 220) the replication group for the packet. In some embodiments, the forwarding element (tunnel endpoint) determines a logical forwarding element and/or logical network to which the source of the packet belongs (e.g., based on a source address of the packet, an interface via which the packet was received, etc.). This logical forwarding element and/or logical network is mapped to a replication group (which may also be based on whether the received packet is a broadcast packet, multicast packet, or unknown unicast packet).

The process 200 then identifies (at 225) a proxy endpoint for each other datacenter that includes tunnel endpoints in the replication group identified for the BUM packet. In some embodiments, the proxy endpoints are identified from a predefined list of selected proxy endpoints for each datacenter, as will be discussed in further detail below.

With the proxy endpoints for each other datacenter identified, the process 200 replicates (at 230) the BUM packet to each of the identified proxy endpoints for the other datacenters with the datacenter flag set. In some embodiments, each of these copies of the BUM packet are encapsulated in a different tunnel header with different destination addresses corresponding to the identified proxy endpoints. In some embodiments, as mentioned, the tunnel header includes a datacenter replication flag (indicating that the receiver of the packet is a datacenter proxy) and a segment replication flag (indicating that the receiver of the packet is a segment proxy). In different embodiments, the sending tunnel endpoint can set or not set the segment flag when the datacenter flag is set.

The process 200 also identifies (at 235) a proxy endpoint for each other physical network segment (e.g., IP subnet, VLAN, multicast island, etc.) in the same datacenter that includes tunnel endpoints in the replication group identified for the BUM packet. In some embodiments, the proxy endpoints are identified from a predefined list of selected proxy endpoints for each segment, as will be discussed in further detail below.

With the proxy endpoints for each other segment in the same datacenter as the source tunnel endpoint identified, the process 200 replicates (at 240) the BUM packet to each of these identified proxy endpoints for the other segments with the segment flag set and the datacenter flag not set. In some embodiments, each of these copies of the BUM packet are encapsulated in a different tunnel header with different destination addresses corresponding to the identified proxy endpoints. By setting the segment replication flag and not the datacenter replication flag, the recipients of these copies of the packet will replicate the packet to other tunnel endpoints in their segment, but not to proxy endpoints in other segments (thereby avoiding replication loops).

In addition, the process 200 identifies (at 245) all other tunnel endpoints in the replication group identified for the BUM packet that are in the same network segment as the source tunnel endpoint. In some embodiments, the tunnel endpoints are identified from a predefined list of all tunnel endpoints in the multicast group, as will be discussed in further detail below.

The process 200 replicates (at 250) the packet to each of these identified tunnel endpoints, in this case with neither the datacenter nor segment replication flags set. These flags instruct the receiving tunnel endpoints to deliver the packet to any connected logical network endpoints that require the packet, but not to further replicate the packet to any other tunnel endpoints. The process 200 then ends.

Figure 3:
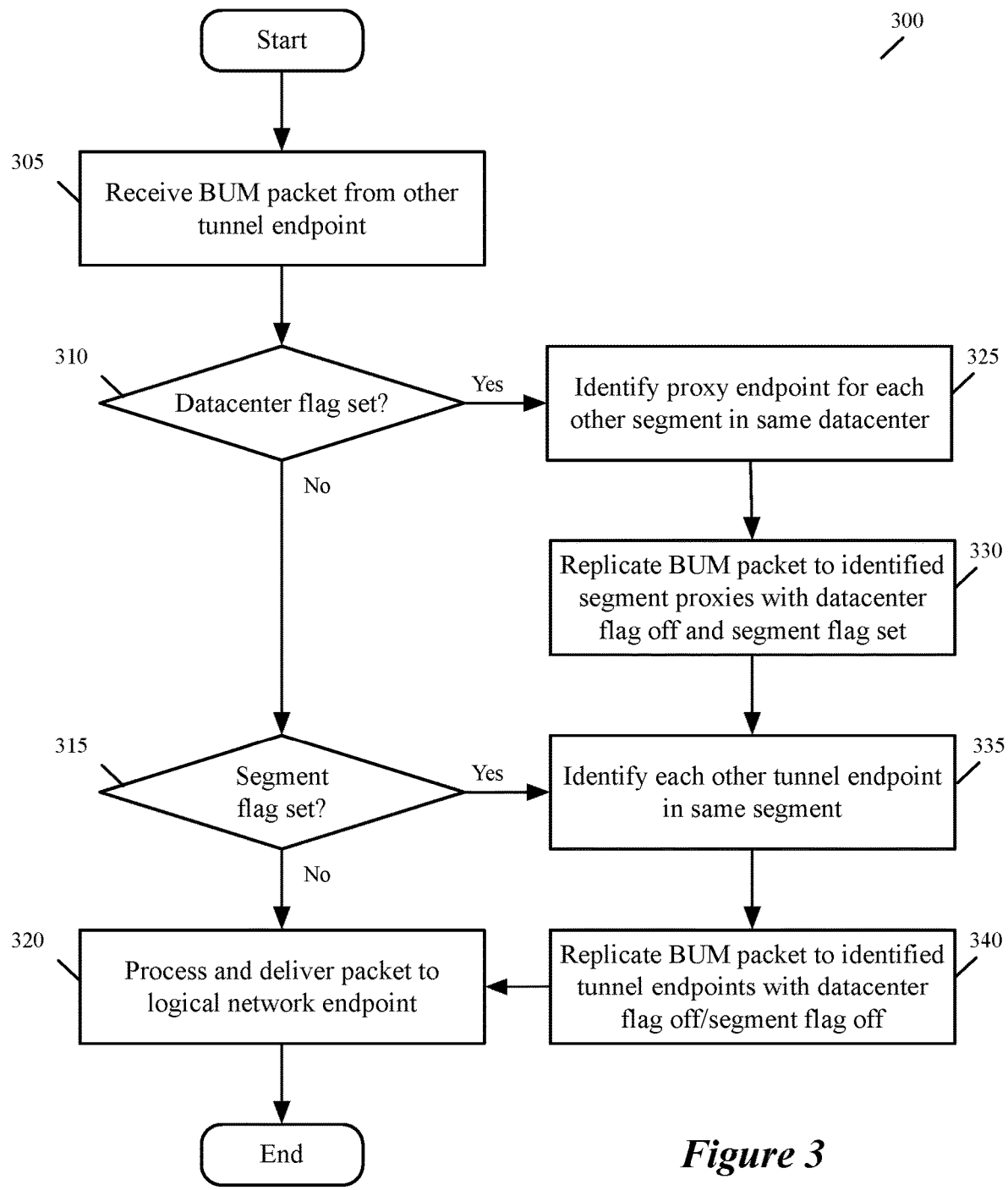
FIG. 3 conceptually illustrates a process performed by a tunnel endpoint in some embodiments when it receives a message for replication from another tunnel endpoint (e.g., a proxy endpoint for a segment or a datacenter).

FIG. 3 conceptually illustrates a process 300 of some embodiments for receiving a message from a tunnel endpoint and replicating the message to one or more destinations. In some embodiments, the process 300 is performed by a tunnel endpoint upon receiving a message from another tunnel endpoint (e.g., a source tunnel endpoint or proxy endpoint for a segment or a datacenter). For example, the process 300 could be performed by any of the proxy tunnel endpoints 121, 131, or 141 or the other recipient tunnel endpoints in FIG. 1, described above.

The process 300 begins by receiving (at 305) a data packet from another tunnel endpoint. In some embodiments, the packet is encapsulated with a tunnel header that includes a datacenter replication flag and a segment replication, either or both of which may be set. The tunnel endpoint from which the encapsulated packet is received may be located in the same network segment, a different network segment of the same datacenter, or a different datacenter. This information is conveyed by which (if any) of the replication flags are set in the tunnel header of the received packet.

The process 300 determines (at 310) whether the packet has the datacenter replication flag set. In some embodiments, as mentioned, the datacenter and segment replication flags are stored in fields of an encapsulation header of the BUM packet. The datacenter replication flag is set when the receiving tunnel endpoint is a datacenter proxy endpoint (i.e., is the only tunnel endpoint in its datacenter that has received the packet at this point).

If the datacenter flag is not set, then the receiving tunnel endpoint is not a datacenter proxy endpoint, and the process proceeds to 315 to determine whether the segment replication flag is set. The segment replication flag is set when the receiving tunnel endpoint is a network segment proxy endpoint (i.e., is the only tunnel endpoint in its network segment that has received the packet at this point). In some embodiments, as shown in this process 300, when the datacenter flag is set, whether the segment flag is set is inconsequential.

If the datacenter and segment replication flags are not set, then the receiving tunnel endpoint is neither a segment proxy endpoint nor a datacenter proxy endpoint, and does not need to further replicate the packet. Accordingly, the process 300 performs packet processing at 320 to deliver the packet to one or more logical network endpoints associated with the receiving tunnel endpoint (i.e., that are connected to the receiving tunnel endpoint). The process 300 then ends.

Returning to 310, if the datacenter flag is set, then the receiving tunnel endpoint is a datacenter proxy endpoint, and has the responsibility to replicate the packet to all other segments in its datacenter. Thus, the process 300 identifies (at 325) a proxy endpoint for each other physical network segment (e.g., IP subnet, VLAN, multicast island, etc.) in the same datacenter that includes tunnel endpoints in the replication group for the BUM packet. In some embodiments, the proxy endpoints are identified from a predefined list of selected proxy endpoints for each segment, as will be discussed in further detail below.

With the proxy endpoints for each other segment in the same datacenter as the receiving tunnel endpoint identified, the process 300 replicates (at 330) the BUM packet to each of these identified proxy endpoints for the other segments with the segment flag set and the datacenter flag not set. In some embodiments, each of these copies of the BUM packet are encapsulated in a different tunnel header with different destination addresses corresponding to the identified proxy endpoints. By setting the segment replication flag and not the datacenter replication flag, the recipients of these copies of the packet will replicate the packet to other tunnel endpoints in their segment, but not to proxy endpoints in other segments (thereby avoiding replication loops).

When the datacenter flag and/or the segment flag is set in the received packet, the process 300 identifies (at 335) all other tunnel endpoints in the replication group for the BUM packet that are in the same network segment as the source tunnel endpoint. In some embodiments, the tunnel endpoints are identified from a predefined list of all tunnel endpoints in the multicast group, as will be discussed in further detail below.

The process 300 replicates (at 340) the packet to each of these identified tunnel endpoints, in this case with neither the datacenter nor segment replication flags set. These flags instruct the receiving tunnel endpoints to deliver the packet to any connected logical network endpoints that require the packet, but not to further replicate the packet to any other tunnel endpoints. In addition to performing any of the required replication, the process 300 processes and delivers (at 320) the packet to one or more logical network endpoints associated with the receiving tunnel endpoint (i.e., that are connected to the receiving tunnel endpoint).

From FIG. 3, it is apparent that in some embodiments, the datacenter flag obviates the need for the segment flag. This is because a tunnel endpoint that serves as a datacenter proxy also serves as a segment proxy. In some embodiments, a tunnel endpoint interprets the datacenter flag as a segment flag, or in other embodiments treats the segment flag as set whenever the datacenter flag is set. However, the reverse is not true, as the segment flag cannot be interpreted as a datacenter flag. This is to prevent segment proxy endpoints that receive the packet from datacenter proxy endpoints from redundantly attempting to select additional segment proxy endpoints in the datacenter.

In some embodiments, each tunnel endpoint belonging to a replication group individually selects the proxy endpoints that it uses for replicating messages to other network segments and other physical networks. To make these selections, in some embodiments each tunnel endpoint receives configuration information from a centralized network control system that identifies the other tunnel endpoints in each replication group to which the tunnel endpoint belongs, sorted into the network segments and physical networks in which each of the other tunnel endpoints is located. In other embodiments, this information may be exchanged directly between tunnel endpoints (e.g., using a distributed control plane protocol).

FIG. 4 conceptually illustrates configuration information stored in some embodiments by a tunnel endpoint, which that tunnel endpoint uses to select proxy endpoints for replicating messages to a multicast group. Specifically, FIG. 4 illustrates an example of configuration information used by source tunnel endpoint 111 to identify proxy endpoints, as described above in relation to FIG. 1. Persons of ordinary skill in the art will understand that the format of the configuration file as illustrated in FIG. 4 is only one of many possible formats.

The configuration information includes a list 405 of all tunnel endpoints in the logical network, which in this example is a VXLAN. The list of tunnel endpoints is organized by multicast group, datacenter, and segment, so that the source tunnel endpoint can quickly identify which VXLAN tunnel endpoints (VTEPs) are in the same multicast group and where they are located. In some embodiments, the tunnel endpoint stores a different list 405 for each replication group.

From this list, it is clear that in this example the tunnel endpoint 111 is a member of two multicast groups, the first group corresponding to the network 100 described above. Further, the tunnel endpoint list stored by the tunnel endpoint 111 does not include an entry for itself, since that is redundant information from its perspective. In some embodiments, the tunnel endpoint modifies the list 405 after receiving it, to remove its own entry. However, in other embodiments, the tunnel endpoint list 405 may also include its own entry, and the tunnel endpoint simply ignores any references to itself when using the list. In addition, the list indicates that there is a third network segment in datacenter 102, that includes additional tunnel endpoints 151-156. This third segment is omitted from the illustration in FIG. 1 for the sake of clarity.

The configuration information also includes a list 410 of the selected proxy endpoints. These are selected by the tunnel endpoint 111, as will be further described below. The list of proxy endpoints is chosen from the list of all tunnel endpoints 405. Because there are two additional segments in datacenter 102, there are only two entries for segment proxy endpoints in the same datacenter. Since there is only one additional datacenter 103, there is only a single entry for a datacenter proxy endpoint in that datacenter. This reflects the fact that the tunnel endpoint 111 only has responsibility for choosing one proxy per segment in its own datacenter, and choosing a single proxy endpoint for the other datacenter. In some embodiments, the list 410 of selected proxy endpoints is generated at the tunnel endpoint, based on the list 405 of all tunnel endpoints in the multicast group. In other embodiments, the list 410 is received from the control plane, from either a central controller or from other tunnel endpoints in distributed fashion.

Based on this configuration information (listing the tunnel endpoints belonging to the replication group, sorted by physical network and network segment), each tunnel endpoint in the group selects proxy endpoints for (i) each other physical network site (e.g., datacenter) and (ii) each other network segment within its respective physical network site. In some embodiments, in order to balance the traffic load and replication burden across the various endpoints, each tunnel endpoint randomly selects the proxy endpoint for each other physical network site, and each other network segment within its respective physical network site (such that different tunnel endpoints will select different proxy endpoints for the same segment or datacenter for the same replication group, thereby balancing the load between these different tunnel endpoints). In other embodiments, the tunnel endpoints also receive traffic load or other statistics and use these to inform the proxy endpoint selection. If a tunnel endpoint receives an update to the list for a network segment or physical network, in some embodiments the tunnel endpoint re-selects the proxy endpoint for that updated network segment or physical network.

Figure 5:
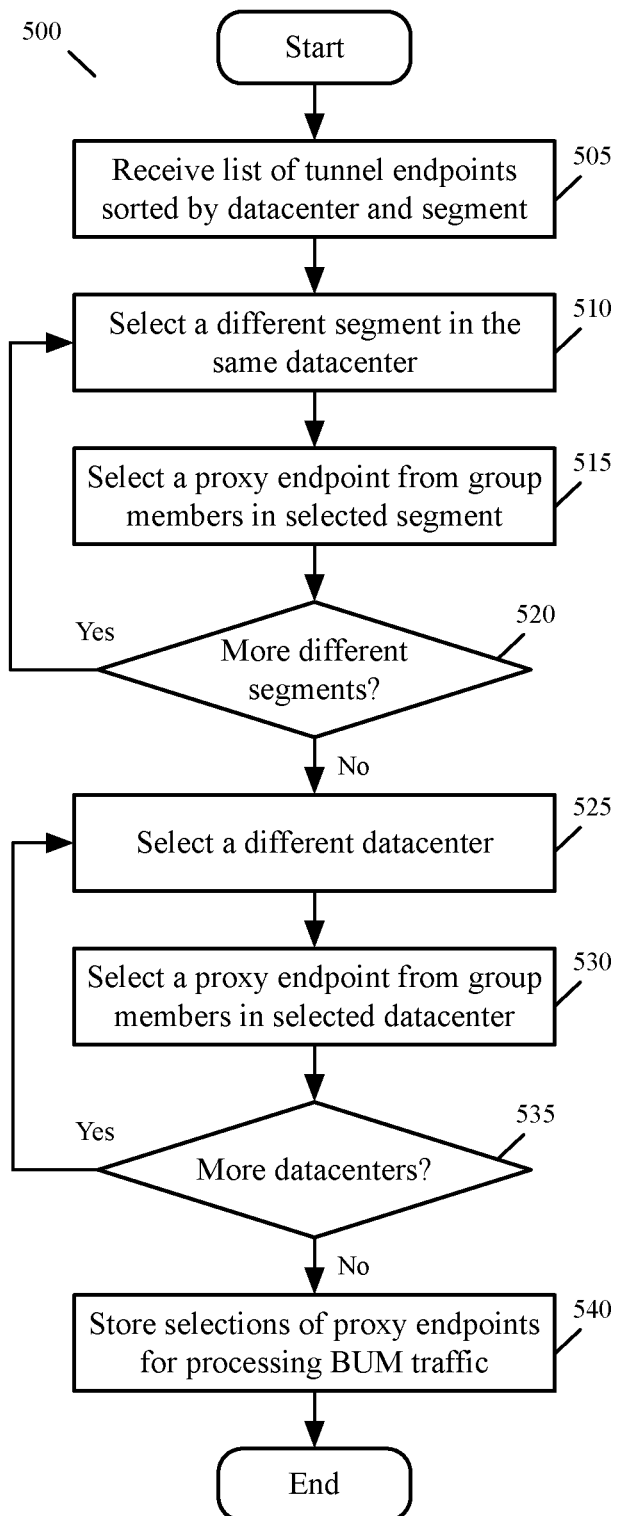
FIG. 5 conceptually illustrates a process performed in some embodiments by a tunnel endpoint to select proxy endpoints for other segments and datacenters.

FIG. 5 conceptually illustrates a process 500 of some embodiments for selecting proxy endpoints. In some embodiments, the process 500 is performed by a tunnel endpoint for each replication group to which the tunnel endpoint belongs. Every tunnel endpoint in a replication group performs the process 500 independently in some embodiments, such that each tunnel endpoint may select different proxy endpoints than other tunnel endpoints in the same segment or datacenter.

As shown, the process 500 begins by receiving (at 505) a list of tunnel endpoints sorted by datacenter and segment (e.g., the configuration data 405 shown in FIG. 4). In some embodiments, the tunnel endpoint includes lists of tunnel endpoints for more than one replication group, in which case the process 500 is performed by the tunnel endpoint for each of these multi cast groups.

The process 500 selects (at 510) a different segment in the same datacenter than the segment in which the tunnel endpoint that performs the process is located (assuming that there is at least one such segment). For the selected segment, the process 500 selects (at 515) one of the members of the multicast group in the segment as the proxy endpoint. In some embodiments, the process 500 identifies members of the multicast group using the configuration information (e.g., the list of all tunnel endpoints). In order to select one of the members, in some embodiments the process selects a proxy endpoint randomly (e.g., computing a random number modulo the number of possible proxy endpoints and correlating this to one of the tunnel endpoints). In other embodiments, the process selects a proxy endpoint based on load information associated with each of the group members in the segment. The load information may be included in the configuration information in some embodiments. After selecting a proxy endpoint for the selected segment, the process 500 determines (at 520) whether there are additional segments in the same datacenter. If so, the process returns to 510, described above.

If there are no additional segments in the same datacenter, then the process 500 selects (at 525) a different datacenter than the datacenter in which the tunnel endpoint that performs the process is located. For the selected datacenter, the process 500 selects (at 530) one of the members of the multicast group in the datacenter as the proxy endpoint. In some embodiments, the process 500 identifies members of the multicast group using the configuration information (e.g., the list of all tunnel endpoints 405). In order to select one of the members, in some embodiments the process 500 selects a proxy endpoint randomly (e.g., computing a random number modulo the number of possible proxy endpoints and correlating this to one of the tunnel endpoints). In other embodiments, the process 500 selects a proxy endpoint based on traffic load information and statistics associated with each of the group members in the segment. The traffic load information and statistics may be included in the configuration information in some embodiments. After selecting a proxy endpoint for the selected datacenter, the process 500 determines at 535 whether there are additional datacenters. If so, the process returns to 525, described above.

If there are no additional segments in the same datacenter, then the process 500 stores at 540 the selections of proxy endpoints for the other segments in the same datacenter, and for the other datacenters, in a local configuration file (e.g., the list of all proxy endpoints 410). The process 500 then ends.

As noted above, in some embodiments a tunnel endpoint may belong to more than one replication group (e.g., be associated with different logical networks or different logical network segments). If a tunnel endpoint belongs to multiple replication groups, then it may select different proxy endpoints for the different replication groups in the same segment or physical network. In addition, that tunnel endpoint may be selected as a proxy endpoint by other tunnel endpoints in multiple replication groups.

In some embodiments, the physical networks include provider networks or datacenters, which may be located in different physical locations. These physical networks may in some embodiments also be grouped by geographic region or area. Network interconnections between different physical network groups may have higher cost, higher latency, and/or lower bandwidth than interconnections between physical networks in the same geographic region. Therefore, some embodiments also provide for additional levels of replication, i.e., for segments of a physical network, physical networks, and groups of physical networks (and groups of groups of physical networks, etc.). In such embodiments, each tunnel endpoint would also select proxy endpoints for each other group of physical networks, and the encapsulation header would include a third flag that could be set.

Figure 6:
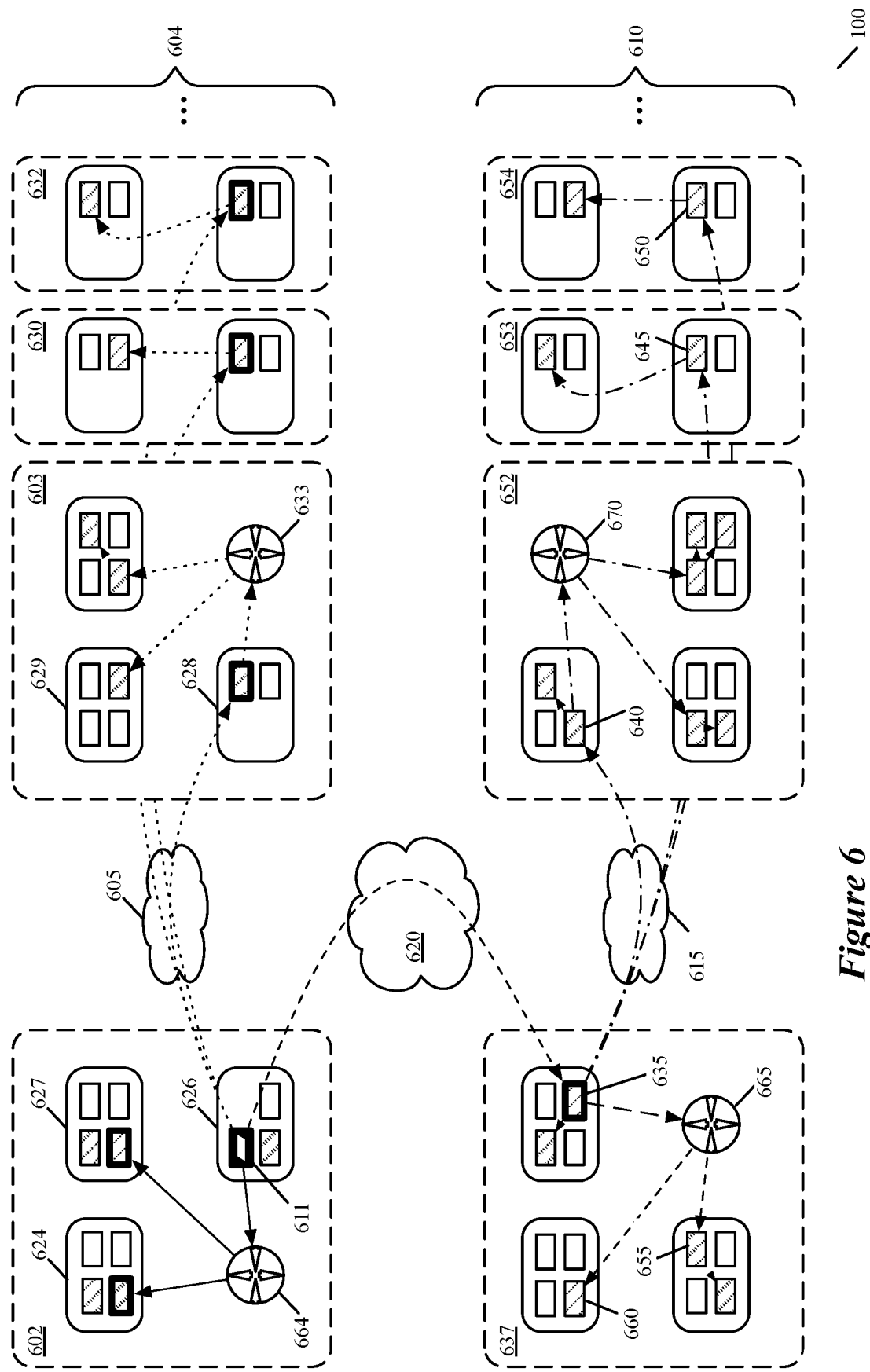
FIG. 6 illustrates a network in which a tunnel endpoint also replicates a data packet to all tunnel endpoints of a particular replication group across different segments, datacenters, and datacenter groups of the network.

FIG. 6 illustrates a network 600 that spans multiple groups of datacenters 605 and 610. The network 600 includes tunnel endpoints that operate in a similar manner as those in the network 100 described above by reference to FIG. 1, but with additional datacenters that are grouped into datacenter groups. In this example, a tunnel endpoint replicates a data packet to all tunnel endpoints of a particular replication group across different segments, datacenters, and datacenter groups of the network. A first datacenter group 604 includes at least datacenters 602, 603, 630, and 632, which are connected via datacenter interconnect 605 (which may represent a set of datacenter interconnects). A second datacenter group 610 includes datacenters 637, 652, 653, and 654, which are connected via datacenter interconnect 615 (which may represent a set of datacenter interconnects). The two datacenter groups 604 and 610 are also connected by a datacenter group interconnect 620 (which may represent a set of datacenter group interconnects). In general, traffic over the inter-group connections 620 (e.g., a long distance link or set of links between distant geographical regions) incurs higher costs (which may be monetary, latency-based, etc.) than traffic over the intra-group connections 605 and 615 (e.g., more local links within a geographical region).

In this case, each tunnel endpoint in a replication group selects (i) a proxy endpoint for each other datacenter group, (ii) a proxy endpoint for each other datacenter within its datacenter group, and (iii) a proxy endpoint for each other network segment within its datacenter. The replication of a data packet 625 received from a source logical network endpoint (e.g., operating on the same host as the source tunnel endpoint) by source tunnel endpoint 611 (illustrated in solid black) is shown in this figure. The replication of the packet to tunnel endpoints in the appropriate replication group within the same datacenter group operates in the same manner as shown in FIG. 1 and described by reference to FIGS. 1 and 2 above.

That is, the source tunnel endpoint replicates the packet to any other tunnel endpoints belonging to the replication group within the same network segment 626 (not shown), as well as to proxy endpoints in segments 627 and 624 (via datacenter network fabric router 664) and to proxy endpoints in each of the other datacenters 603, 630, and 632 within the same datacenter group 604. These datacenter proxy endpoints then replicate the packet to proxy endpoints in the other segments of their respective datacenters, which also replicate the packet as required within their respective segments.

For reasons of clarity, the replicated packets are illustrated as being sent directly to the receiving proxy endpoints in each datacenter, though in practice the packets must transit via internal datacenter routers (e.g., 664, 633) first (not shown for datacenters 630 and 632). Only a few tunnel endpoints are illustrated in each segment of each datacenter, with those in the same multicast group as the source tunnel endpoint 611 illustrated with diagonal lines, and the proxy endpoints selected by the source tunnel endpoint 611 outlined with a thicker border. As noted above, each tunnel endpoint in a given segment may belong to more than one replication group, and not every tunnel endpoint in a given segment necessarily belongs to the same replication group as source tunnel endpoint 611.

The multicast group to which source tunnel endpoint 611 belongs also has additional members in the second datacenter group 610 (these members are also illustrated with dashed lines). Accordingly, the source tunnel endpoint 611 must also replicate the packet 625 to these members. In some embodiments, the source tunnel endpoint selects (e.g., by performing a process analogous to process 500, extended to datacenter groups) a proxy endpoint 635 for the datacenter group 610 from the list of tunnel endpoints for the replication group received by the tunnel endpoint 611.

Group proxy endpoint 635 in datacenter 637 receives the packet 625 from source tunnel endpoint 611 over the datacenter group interconnect 620. The group proxy endpoint 635 is also outlined in a thicker border to indicate that it was selected as a proxy endpoint by source tunnel endpoint 611. The group proxy endpoint would have performed a process similar to process 500 to select datacenter proxy endpoints 640, 645, and 650 for the other datacenters 652-654 in its datacenter group, and selects segment proxy endpoints 655 and 660 for the segments in its own datacenter. Note that the proxy endpoints selected by group proxy endpoint 635 are not outlined in a thicker border, as they were not selected as proxies by source tunnel endpoint 611.

Group proxy endpoint 635 then replicates the packet 625 to the other members of the replication group in the same datacenter group 610 (e.g., performing a process similar to the process 300, extended to another layer of hierarchy with a check for a third flag). As above, for reasons of clarity, the replicated packets are illustrated as being sent directly to the receiving proxy endpoints (including 635) in each datacenter, though in practice the packets must transit via internal datacenter routers (e.g., 665 and 670) first (not shown for datacenters 653 and 654). Other members of the multicast group in datacenter group 610 that receive the packet from group proxy endpoint 635 then also replicate the packet as described above. In some embodiments, these members of the multicast group perform a process similar to the process 300, extended to another layer of hierarchy with a check for a third flag.

In some embodiments, the hierarchical levels of replication are not limited to just segments, datacenters, and datacenter groups. Additional higher levels such as states or provinces, national boundaries, and even inter-continental levels of hierarchy can be implemented in the same fashion as described above. At every level of hierarchy, the cost of transmitting data between the elements of that hierarchy level may be higher than the cost of transmitting data between the elements of the next lower level, so only a single proxy tunnel endpoint is assigned to each level by the original source tunnel endpoint. Therefore, even as the number of multicast group members increase exponentially (e.g., with the number of multicast group members), the number of proxies selected by any proxy at any level only increases linearly (with the number of hierarchy levels).

As used in this specification, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples above refer to data packets, packets, data messages, or messages, it should be understood that the invention should not be limited to any specific format or type of data message. Further, the terms endpoint, end machine and virtual machine (VM) may be used herein to refer to any instance of a data compute node (DCN) that operates in virtualization software, including VMs and containers that execute within VMs. While the examples above refer to virtual machines, it should be understood that the invention should not be limited to any specific type of DCN.

This specification refers throughout to computational and network environments that include virtual machines (VMs). However, virtual machines are merely one example of data compute nodes (DNCs) or data compute end nodes, also referred to as addressable nodes or endpoints. DCNs may include non-virtualized physical hosts, virtual machines, containers that run on top of a host operating system without the need for a hypervisor or separate operating system, and hypervisor kernel network interface modules. In fact, the example networks could include combinations of different types of DCNs in some embodiments.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, are a type of non-VM DCN that includes a network stack with a hypervisor kernel network interface and receive/transmit threads. One example of a hypervisor kernel network interface module is the vmknic module that is part of the ESX hypervisor of VMware Inc.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
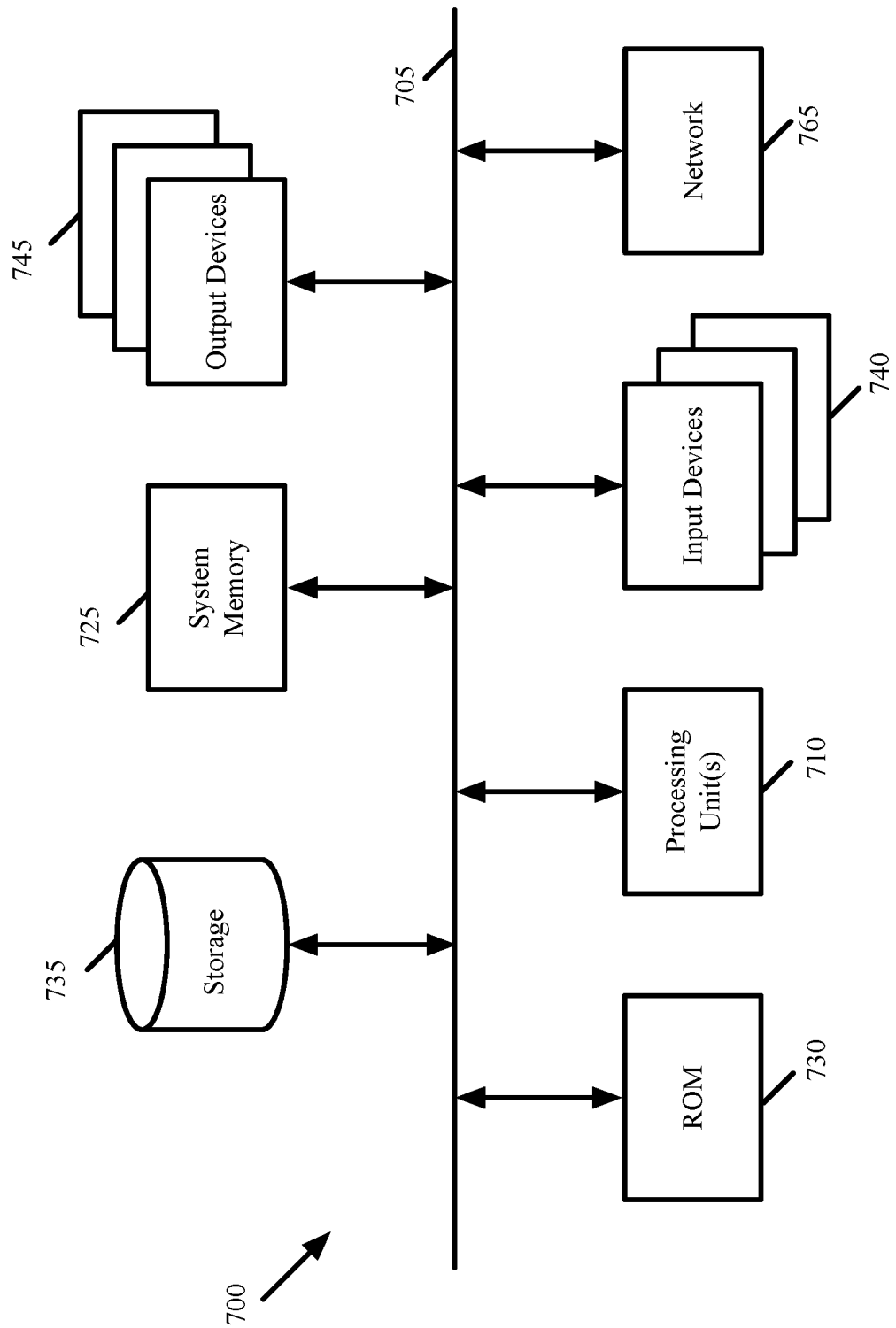
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of replicating messages to members of a replication group across a plurality of datacenters, the method comprising:
at a particular proxy endpoint in a particular segment of a particular datacenter:
receiving a message from a source tunnel endpoint in a source datacenter for the message, the message to be replicated to members of the replication group comprising the particular proxy endpoint, wherein the source tunnel endpoint replicates the message to proxy endpoints in each of the plurality of datacenters;
replicating the message to a set of proxy endpoints each of which (i) is located in a different segment of the particular datacenter than the particular segment and (ii) is for replicating the message to tunnel endpoints of the replication group located in its respective segment of the particular datacenter; and
replicating the message to a set of tunnel endpoints of the replication group located in the particular segment of the particular datacenter.

2. The method of claim 1, wherein:
replicating the message to the set of proxy endpoints comprises encapsulating the message with a first encapsulating header that stores a first flag indicating that the message should be replicated to all local endpoints of the replication group in the same segment as the proxy endpoint receiving the message; and
the message received from the source tunnel endpoints comprises a second encapsulating header that stores a second flag indicating that the message should be replicated to all proxy endpoints of the replication group in different segments of the same datacenter as the particular proxy endpoint.

3. The method of claim 2, wherein replicating the message to the set of tunnel endpoints comprises encapsulating the message with a third encapsulation header that does not store the first flag or the second flag.

4. The method of claim 1, wherein:
the particular datacenter is a first datacenter, the source datacenter is a second datacenter, the particular proxy endpoint is a first proxy endpoint, the set of proxy endpoints is a first set of proxy endpoints, and the set of tunnel endpoints is a first set of tunnel endpoints; and
a second proxy endpoint in a third datacenter (i) receives the message from the source tunnel endpoint, (ii) replicates the message to a second set of proxy endpoints each of which is located in a different segment of the third datacenter than the second proxy endpoint, and (iii) replicates the message to a second set of tunnel endpoints located in a same segment of the third datacenter as the second proxy endpoint.

5. The method of claim 1, wherein the segments are segments of a logical network implemented across the plurality of datacenters.

6. The method of claim 5, wherein the logical network is a logical overlay network and the tunnel endpoints are used to establish the logical overlay network.

7. The method of claim 1 further comprising:
receiving, at the particular proxy endpoint, a list of members for the replication group at all segments of all datacenters in the plurality of datacenters; and
based on the received list:
selecting a proxy endpoint for each segment in the particular datacenter other than the particular segment, wherein the set of proxy endpoints comprises the selected proxy endpoints; and
selecting a proxy endpoint for each other datacenter.

8. The method of claim 7, wherein selecting a proxy endpoint for a specific segment of the particular datacenter comprises randomly selecting a tunnel endpoint in the specific segment that is a member of the replication group.

9. The method of claim 7, wherein selecting a proxy endpoint for a specific datacenter comprises randomly selecting a tunnel endpoint in the specific datacenter that is a member of the replication group.

10. The method of claim 7, wherein the selected proxy endpoint for the source datacenter is not the source tunnel endpoint of the message.

11. A non-transitory machine-readable medium storing a program which when executed by at least one processing unit operates as a particular proxy endpoint in a particular segment of a particular datacenter to replicate messages to members of a replication group across a plurality of datacenters, the program comprising sets of instructions for:
receiving a message from a source tunnel endpoint in a source datacenter for the message, the message to be replicated to members of the replication group comprising the particular proxy endpoint, wherein the source tunnel endpoint replicates the message to proxy endpoints in each of the plurality of datacenters;
replicating the message to a set of proxy endpoints each of which (i) is located in a different segment of the particular datacenter than the particular segment and (ii) is for replicating the message to tunnel endpoints of the replication group located in its respective segment of the particular datacenter; and
replicating the message to a set of tunnel endpoints of the replication group located in the particular segment of the particular datacenter.

12. The non-transitory machine-readable medium of claim 11, wherein:
the set of instructions for replicating the message to the set of proxy endpoints comprises a set of instructions for encapsulating the message with a first encapsulating header that stores a first flag indicating that the message should be replicated to all local endpoints of the replication group in the same segment as the proxy endpoint receiving the message; and
the message received from the source tunnel endpoints comprises a second encapsulating header that stores a second flag indicating that the message should be replicated to all proxy endpoints of the replication group in different segments of the same datacenter as the particular proxy endpoint.

13. The non-transitory machine-readable medium of claim 12, wherein the set of instructions for replicating the message to the set of tunnel endpoints comprises a set of instructions for encapsulating the message with a third encapsulation header that does not store the first flag or the second flag.

14. The non-transitory machine-readable medium of claim 11, wherein:
the particular datacenter is a first datacenter, the source datacenter is a second datacenter, the particular proxy endpoint is a first proxy endpoint, the set of proxy endpoints is a first set of proxy endpoints, and the set of tunnel endpoints is a first set of tunnel endpoints; and
a second proxy endpoint in a third datacenter (i) receives the message from the source tunnel endpoint, (ii) replicates the message to a second set of proxy endpoints each of which is located in a different segment of the third datacenter than the second proxy endpoint, and (iii) replicates the message to a second set of tunnel endpoints located in a same segment of the third datacenter as the second proxy endpoint.

15. The non-transitory machine-readable medium of claim 11, wherein the segments are segments of a logical network implemented across the plurality of datacenters.

16. The non-transitory machine-readable medium of claim 15, wherein the logical network is a logical overlay network and the tunnel endpoints are used to establish the logical overlay network.

17. The non-transitory machine-readable medium of claim 11, wherein the program further comprises sets of instructions for:
receiving, at the particular proxy endpoint, a list of members for the replication group at all segments of all datacenters in the plurality of datacenters; and
based on the received list:
selecting a proxy endpoint for each segment in the particular datacenter other than the particular segment, wherein the set of proxy endpoints comprises the selected proxy endpoints; and
selecting a proxy endpoint for each other datacenter.

18. The non-transitory machine-readable medium of claim 17, wherein the set of instructions for selecting a proxy endpoint for a specific segment of the particular datacenter comprises a set of instructions for randomly selecting a tunnel endpoint in the specific segment that is a member of the replication group.

19. The non-transitory machine-readable medium of claim 17, wherein the set of instructions for selecting a proxy endpoint for a specific datacenter comprises a set of instructions for randomly selecting a tunnel endpoint in the specific datacenter that is a member of the replication group.

20. The non-transitory machine-readable medium of claim 17, wherein the selected proxy endpoint for the source datacenter is not the source tunnel endpoint of the message.

* * * * *